Patented Oct. 13, 1931

1,826,790

UNITED STATES PATENT OFFICE

EDUARD JALOWETZ AND MAX HAMBURG, OF VIENNA, AUSTRIA

METHOD OF OBTAINING MALT ENZYMES AND BEVERAGE

No Drawing. Application filed December 17, 1928, Serial No. 326,696, and in Austria December 28, 1927.

Experiments carried out in the Institute of Fermentation Industry at Vienna have shown that the brewing malts manufactured in the usual way contain far too great quantities of certain albuminous matters, especially those contained in the glumes of the malt, and further the enzymes effect a too great decomposition of the albuminous substance and of the starch, both of which influence the flavor, the froth and the stability of the beverage undesirably.

The purpose of the present invention is to separate and obtain such enzymes and soluble albuminous matters of the malt which have been destroyed in beverage brewing and which undesirably influenced the quality of the beverage, and then to brew the beverage in the usual manner.

It is old in malt extract manufacture to produce enzymatic malt extracts by mashing the malt with warm water, thus dissolving the enzymes, separating the solution and concentrating the same. Besides the enzymes, the extracts obtained in this way contain also considerable quantities of peptonized albumen, and inorganic phosphates formed from the insoluble albuminous substance, the activity of the enzymes, the starch and the organic compounds of phosphorus contained in the malt at the temperatures commonly used in mashing. At those temperatures a great quantity of fermentation acids are also formed, influencing the enzymes of the malt in an unfavorable way with the effect that the enzymatic capacity of the extracts is greatly reduced. After drawing off the enzymatic extract the residue of the mash contains a lot of fermentation acids but only a relatively small quantity of peptonized albuminous substance and mineral phosphates. In order to convert the starch contained in the remaining mash, a certain percentage of fresh malt had to be added so as to facilitate the conversion which was accomplished by heating to 70° C. The extract thus obtained contains consequently a small quantity of peptones and inorganic phosphates, a relatively large quantity of fermentation acids, besides maltose and maltodextrin. The composition of such an extract is therefore entirely different from a wort properly so called and it is therefore, impossible to get a beverage of normal flavor out of such an extract. It was therefore, quite impossible to use the methods employed in malt extract manufacturing in beverage brewing, since the danger of destroying the enzymes by the fermentation acids is in brewing far greater than in malt extracting because larger quantities of malt are mashed, requiring much more time for the operation.

According to the present invention a method has been found to recover the enzymes not required in the brewing process which have heretofore been destroyed, and to utilize the same in a profitable way; further, by regulating the enzymatic action on the albuminous and starchy substances and by removing the undesirable soluble products of the malt, it was possible to improve the wort and consequently the beverage to a far greater extent than that effected by the known methods of brewing.

The process is carried out in such a way that the malt is mashed with water at such temperatures below 35° C., that an action of the peptonizing enzymes on the albuminous matters of the malt and the formation of fermentation acids injuring the enzymes of the malt cannot take place. The aqueous solution containing the enzymes and the albuminous matters already present in the malt is removed as far as is expedient considering the quality of the malt; out of the remaining malt mash the wort is made in any of the known ways of mashing. The mashing process can be carried out with any of the waters used in the brewery, either in the original condition or after preparation according to any of the usual processes, for instance by adding lime, gypsum, mineral or organic acids or by addition of organic or inorganic salts which act as activating or buffer substances.

The aqueous solution of the enzymes so obtained is, after concentration, far more active than most of the malt extract preparations known, and possesses an enzymatic capacity four or five times as high as a product obtained out of long grown malt containing the whole extract of the malt. In the usual method of manufacturing enzymatic preparations a considerable quantity of second rate malt extracts are obtained as a by-product, containing very little inorganic phosphates, peptones and enzymes which cannot be utilized profitably; therefore the production of highly enzymatic malt extracts is relatively very expensive; this disadvantage is removed by the present invention.

The wort obtained by the described process is more favorably compounded as regards the quantity and quality of the albuminous matters and the starch decomposition products than the wort made in the usual way.

The beverage obtained out of such a wort has a superior flavor, a denser froth and keeps much better. These improvements of the quality of the beverage show that by the described process an important technical effect is obtained which by no means could be foreseen.

We claim:

A process of preparing an enzymatic substance and a beverage of improved quality from malt, which comprises the steps of removing enzymes and other water soluble materials which cause undesirable flavors in the finished beverage by grinding the malt and dissolving said substances therefrom with water at a temperature below that at which the enzymes of the malt become active, removing the solution from the malt residue, and preparing a beverage from said residue.

In testimony whereof we affix our signatures.

EDUARD JALOWETZ.
MAX HAMBURG.